US012716559B2

(12) United States Patent
Bostick

(10) Patent No.: US 12,716,559 B2
(45) Date of Patent: Aug. 25, 2026

(54) BALANCING SUPPORT STABILIZATION DEVICE FOR USE WITH FIXTURES

(71) Applicant: PEGAPOD LLC, Chantilly, VA (US)

(72) Inventor: Randall Bostick, Aldie, VA (US)

(73) Assignee: PEGAPOD LLC, Chantilly, VA (US)

( * ) Notice: Subject to any disclaimer, the term of this patent is extended or adjusted under 35 U.S.C. 154(b) by 0 days.

(21) Appl. No.: 19/190,326

(22) Filed: Apr. 25, 2025

(65) Prior Publication Data

US 2025/0334238 A1 Oct. 30, 2025

Related U.S. Application Data

(60) Provisional application No. 63/639,629, filed on Apr. 27, 2024.

(51) Int. Cl.
*F21S 8/08* (2006.01)
*F16M 11/24* (2006.01)
*F21V 21/10* (2006.01)

(52) U.S. Cl.
CPC .............. *F21S 8/088* (2013.01); *F16M 11/24* (2013.01); *F21V 21/10* (2013.01); *F16M 2200/041* (2013.01)

(58) Field of Classification Search
CPC ............................... F21V 21/145; F21V 21/16
See application file for complete search history.

(56) References Cited

U.S. PATENT DOCUMENTS 4,221,088 A * 9/1980 Patterson ................ E04H 12/34 52/120
5,611,177 A * 3/1997 Herbstritt .................. B60P 3/18 212/293
5,782,042 A 7/1998 Klein
6,517,225 B1 * 2/2003 Allen ........................ B60P 3/18 362/403
7,525,212 B1 * 4/2009 Catlin ..................... F03B 13/22 290/53
8,494,725 B2 * 7/2013 Zurfluh .................... H01Q 1/34 248/157
10,477,715 B2 11/2019 Struhsaker et al.
10,856,381 B2 * 12/2020 Harknett ................... F21S 9/04
11,293,406 B2 * 4/2022 Wagner ................... E04H 12/20
11,385,645 B2 * 7/2022 Wang ................... G05D 1/0016
(Continued)

FOREIGN PATENT DOCUMENTS

CN 117927079 A 4/2024

*Primary Examiner* — Leah Macchiarolo
(74) *Attorney, Agent, or Firm* — HAYES SOLOWAY P.C.

(57) ABSTRACT

A balancing support system has a first and a second elongated member. The first elongated member is configured to interface with a base. A distal end of the first elongated member extends away from the base. Each of the first and second elongated members has at least one propulsion device attached thereto. An end member is attached to the distal end of the first elongated member, wherein the end member is configured to removably attach to the second elongated member. At least one sensor is attached to the first or second elongated member. The at least one sensor activates the at least one propulsion device on at least one of the first and second elongated members. When activated, at least one of the first and second elongated members is stabilized to a predetermined position, such as a predetermined upright position.

23 Claims, 9 Drawing Sheets

(56) References Cited

U.S. PATENT DOCUMENTS

| | | | | |
|---|---|---|---|---|
| 11,415,301 | B2 * | 8/2022 | Johnson | F21L 4/02 |
| 11,420,771 | B2 | 8/2022 | Bostick | |
| 11,987,387 | B2 | 5/2024 | Bostick | |
| 2010/0078942 | A1 * | 4/2010 | Bois | H02S 10/12 290/54 |
| 2010/0232148 | A1 * | 9/2010 | Sharpley | F21V 21/22 362/183 |
| 2011/0016804 | A1 | 1/2011 | Howard et al. | |
| 2011/0196581 | A1 * | 8/2011 | Zurfluh | H01Q 1/10 701/49 |
| 2013/0039049 | A1 * | 2/2013 | Jones | F21V 21/15 362/184 |
| 2014/0115977 | A1 | 5/2014 | Egan et al. | |
| 2014/0345858 | A1 * | 11/2014 | Brouwer | E21B 19/08 166/66 |
| 2016/0177590 | A1 * | 6/2016 | Gorney | E04H 12/187 52/114 |
| 2020/0055613 | A1 * | 2/2020 | Miller | G05D 1/0676 |
| 2021/0247059 | A1 * | 8/2021 | Johnson | F21V 21/145 |
| 2022/0177159 | A1 * | 6/2022 | Bostick | B64U 10/60 |
| 2024/0237170 | A1 | 7/2024 | Bostick | |
| 2024/0300669 | A1 | 9/2024 | Bostick | |
| 2025/0257854 | A1 * | 8/2025 | Grasz | F21L 14/04 |
| 2025/0346364 | A1 * | 11/2025 | Schumann | F21V 23/02 |

* cited by examiner 10
11
12
14
16
18
20
28
30
32

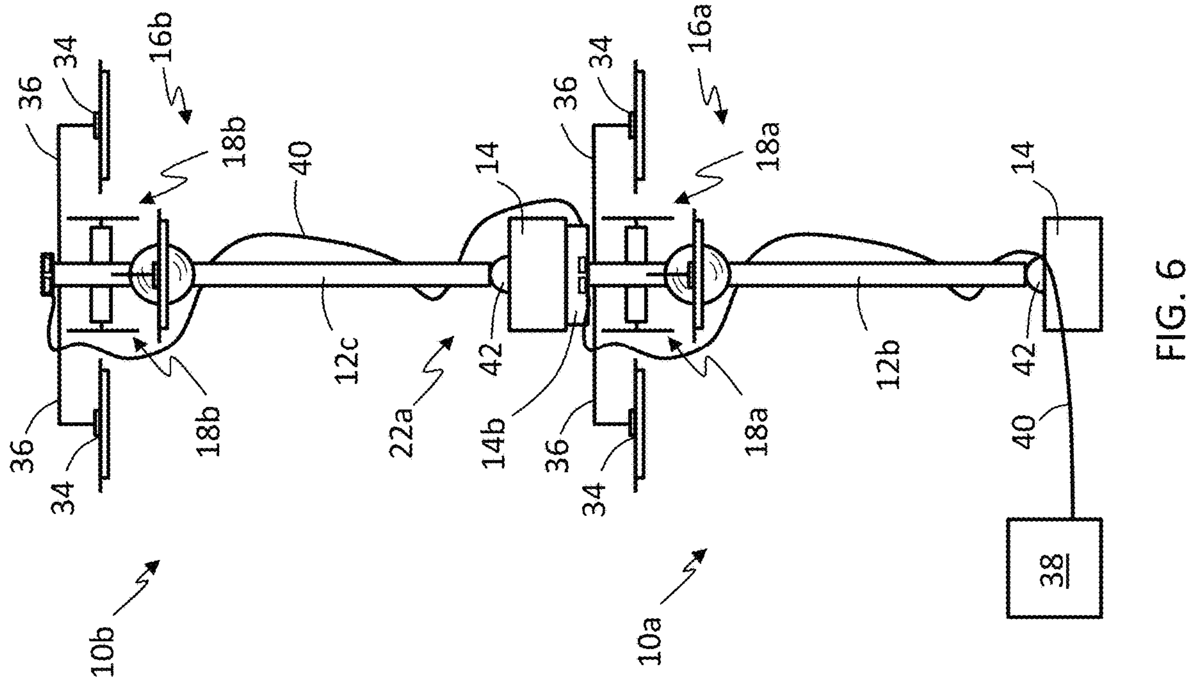
FIG. 6

BALANCING SUPPORT STABILIZATION DEVICE FOR USE WITH FIXTURES

CROSS REFERENCE TO RELATED APPLICATION

This application claims benefit of U.S. Provisional Application Ser. No. 63/639,629 filed Apr. 27, 2024, the entire disclosure of which is incorporated herein by reference.

FIELD OF THE DISCLOSURE

The present disclosure is generally related to stabilization systems and more particularly is related to balancing support stabilization devices for use with fixtures.

BACKGROUND OF THE DISCLOSURE

Many activities or situations at night may require high quality lighting. Temporary lighting is required for certain events. Such events may include entertainment events, such as concerts, sports games or emergency situations and road closures. Commercially available temporary lighting poles currently require large and heavy bases which are not easily portable. Moreover, maintaining a vertical alignment of poles in varying environmental conditions presents significant challenges. This is particularly noticeable in situations where external forces such as wind or mechanical impact may cause displacement of a pole. Typically, these poles are maintained in a vertical position by using heavy and large rigid structural reinforcements, such as concrete, wide bases, or vehicle-mounted bases. These structures are often not adaptable or efficient in dynamic conditions where portability is desired.

Developments in tethered-drone lighting have enabled illumination from higher altitudes, but a pilot may required for safety, and tethered drone may have high energy requirements. Thus, for cost efficiency, tethered-drone lighting systems have some drawbacks.

SUMMARY OF THE DISCLOSURE

Embodiments of the present disclosure provide a system and method for a balancing support device. Briefly described, in architecture, one embodiment of the system, among others, can be implemented as follows. A balance support device has an elongated member configured to interface with a base, wherein a distal end of the elongated member extends away from the base. At least one propulsion device is attached to the elongated member. At least one sensor is in electrical communication with the at least one propulsion device. The at least one sensor activates the at least one propulsion device. When activated, the at least one propulsion device stabilize the elongated member to a predetermined position.

The present disclosure can also be viewed as providing a system for a balancing support device. Briefly described, in architecture, one embodiment of the system, among others, can be implemented as follows. A balancing support system has a first and a second elongated member. The first elongated member is configured to interface with a base. A distal end of the first elongated member extends away from the base. Each of the first and second elongated members has at least one propulsion device attached thereto. An end member is attached to the distal end of the first elongated member, wherein the end member is configured to removably attach to the second elongated member. At least one sensor is attached to the first or second elongated member. The at least one sensor activates the at least one propulsion device on at least one of the first and second elongated members. When activated, at least one of the first and second elongated members is stabilized to a predetermined position.

The present disclosure can also be viewed as providing methods of balancing a support device. In this regard, one embodiment of such a method, among others, can be broadly summarized by the following steps: Positioning an elongated member to interface with a base, wherein the elongated member extends away from the base, wherein at least one propulsion device is attached to the elongated member; sensing, with a sensor, movement of the elongated member away from a predetermined position; activating at least one propulsion device when the sensor senses movement of the elongated member away from the predetermined position; and stabilizing, with the at least one propulsion device the elongated member to the predetermined position.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a front plan view of balance support devices in a vertically stacked arrangement, in accordance with the present disclosure.

DETAILED DESCRIPTION

Figure 1:
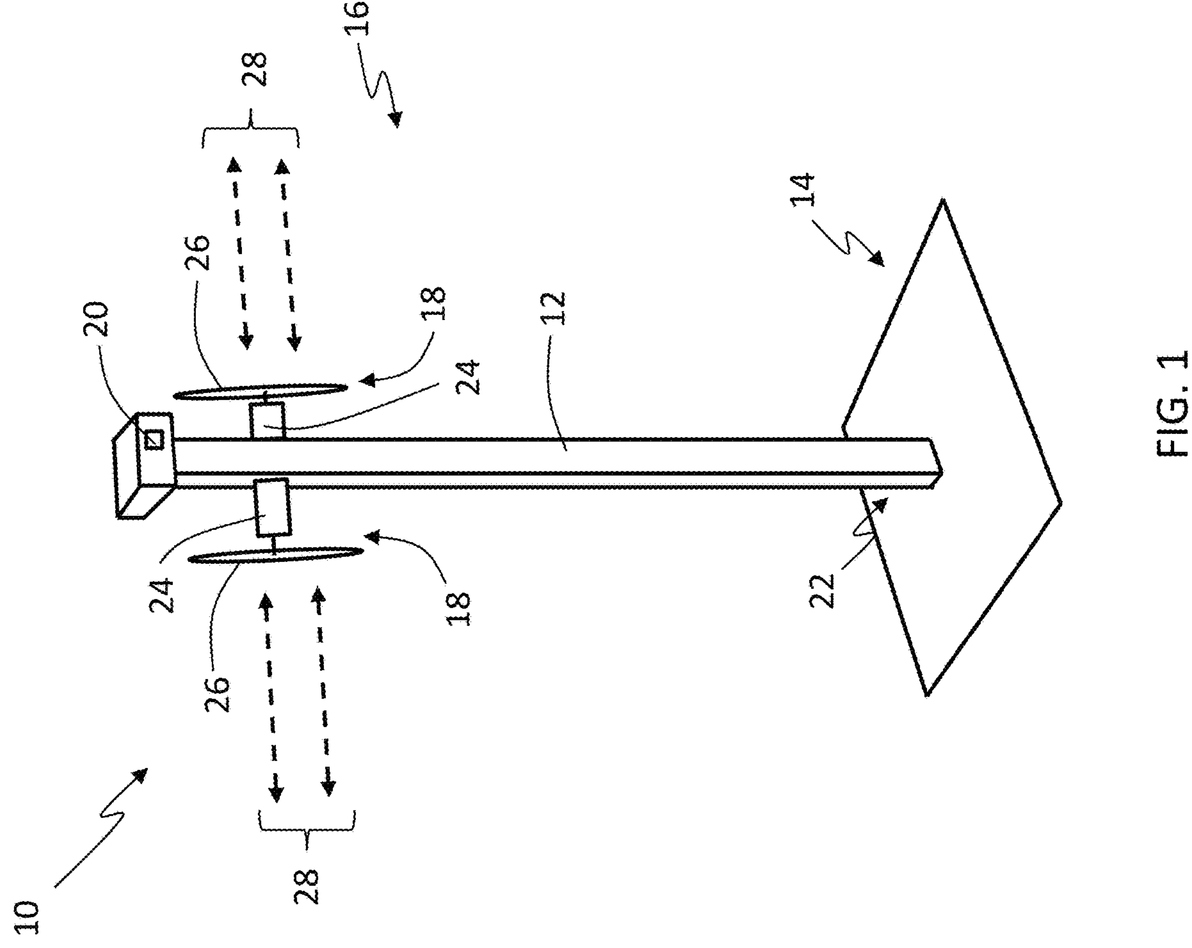
FIG. 1 is a side perspective view of a balance support device in a predetermined position, in accordance with the present disclosure.

FIG. 1 is a side perspective view of a balance support device 10 in a predetermined position, for instance, a predetermined upright position in this example, in accordance with the present disclosure. The balance support device 10 has an elongated member 12 which may be configured to interface with a base 14. A distal end 16 of the elongated member 12 extends away from the base 14. At least one propulsion device 18 may be attached to the elongated member 12. At least one sensor 20 may be in electrical communication with the at least two propulsion devices 18. The at least one sensor 20 may activate the at least one propulsion device 18. When activated, the at least one propulsion device 18 may stabilize the elongated member 12 to a predetermined position.

The elongated member 12 may be a pole or other structure constructed from plastic, PVC, fiberglass, metal, wood, or other composite material. The elongated member 12 is configured to interface with a base 14, which may be a block or other structural member made from plastic, PVC, fiberglass, metal, wood, or other composite material. The elongated member 12 may removably connect to the base 14 to create a modular system which can be assembled and disassembled. The elongated member 12 may connect to the base 14 by using a fastener, securement in a pocket or flange configured to receive the bottom portion 22 of the elongated member 12 or by other feasible attachment methods. In some examples, the base 14 may be the ground, and the elongated member 12 secured either by fasteners to the ground or may be sufficiently weighted at the bottom portion 22. In another example, the base 14 may be a wall, such that when the elongated member 12 is mounted to the wall, it may be positioned in at least a partially horizontal position in relation to a ground surface. In another example, the base 14 may be a conduit positioned within the ground and configured to receive at least a portion of the bottom portion 22 of the elongated member 12. The elongated member 12 may also be secured to the base 14 to substantially limit lateral movement of the bottom portion 22 of the elongated member 12.

The distal end 16 of the elongated member 12 extends away from the base 14 in a substantially vertical or upwards direction. Two propulsion devices 18 may be attached either directly or indirectly to elongated member 12. Each propulsion device 18 may include a motor 24 and a propeller 26, fan, propulsor, or other air-driver. When at least one of the propulsion devices 18 is active, a force may be exerted which may sway or move the distal end 16 of the elongated member 12 to a predetermined position, such as a predetermined upright position. The elongated member 12 may be constructed of a material, such that the entirety of a length of the elongated member 12 is non-rigid, and is susceptible to bending or swaying motions.

At least one sensor 20 may be used to activate at least one of the at least two propulsion devices 18. The sensor 20 senses movement along the length of the elongated member 12, namely at the distal end 16 of the elongated member 12. The sensor 20 may include accelerometers, gyroscopes, and position sensors and may continuously monitor the position of the distal end 16 of the elongated member 12. If the sensor 20 detects movement away from the predetermined position, it may activate at least one of the at least two propulsion devices 18. Upon activation, at least one of the at least two propulsion devices 18 may exert a thrust force 28, by driving the propeller 26, to align, position, reposition, or return the distal end 16 of the elongated member 12 to the predetermined position. The thrust force 28 may be a pushing or pulling force exerted on the elongated member 12. The thrust force 28 exerted by the propulsion devices 18 may be a force substantially perpendicular to the distal end 16 of the elongated member 12. The sensor 20 may also monitor the rotational speed of the motor 24 and/or propellor 26 of each propulsion device 18. Based on the monitored rotational speed of the motor 24 and/or propellor 26, the thrust force 28 exerted by each propulsion device 18 can be adjusted to maintain the stability of the distal end 16 of the elongated member 12.

Figures 2A, 2B, 2C:
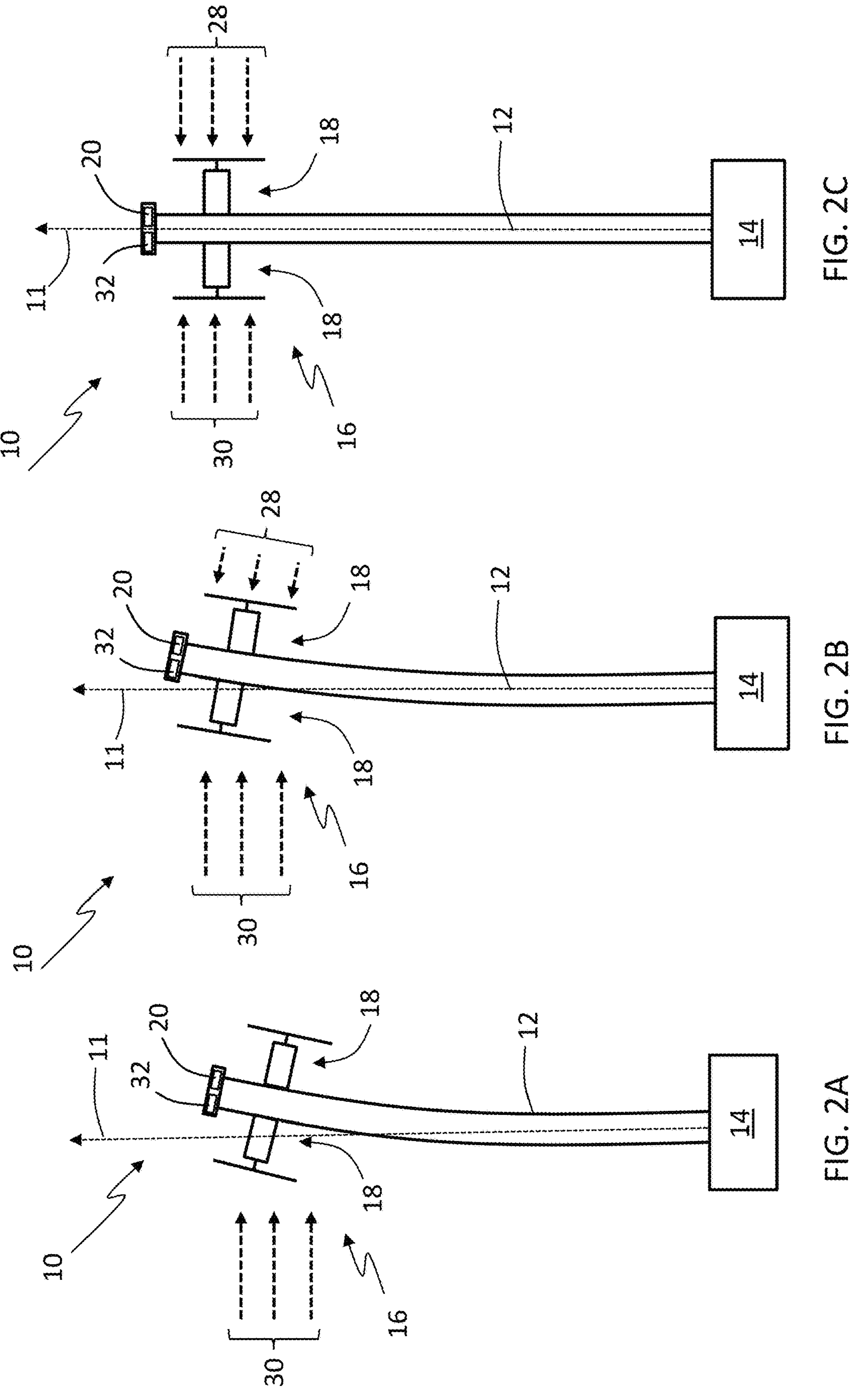
FIGS. 2A-2C illustrate the balance support device in a flexed position, partially flexed position, and upright position, respectively, in accordance with the present disclosure.

FIGS. 2A-2C illustrate the balance support device 10 in a flexed position, partially flexed position, and upright position, respectively, in accordance with the present disclosure. FIG. 2A illustrates the distal end 16 of the elongated member 12 in a flexed position, e.g., where at least a portion of the length of the elongated member 12 is not axially aligned with a vertical axis 11, which may be the result of an external force 30 being applied to the elongated member 12, in accordance with the present disclosure. The external force 30 may be any force, such as wind force, a gravitational force, or a mechanical force resultant from an object impacting the distal end 16 of the elongated member 12 or along the elongated member 12 in another location, among other forces. The external force 30 may displace the distal end 16 of the elongated member 12 away from the predetermined upright position.

FIG. 2B illustrates the distal end 16 of the elongated member 12 in a partially flexed position, in accordance with the present disclosure. Upon the sensor 20 detecting a change in the position of the distal end 16 of the elongated member 12 away from the predetermined upright position, the sensor 20 may activate the propulsion device 18 opposite to the external force 30. The propulsion device 18 exerts a thrust force 28 in the direction of the external force 30 (a pushing force on the elongated member 12), such that the net force exerted on the distal end 16 of the elongated member 12 decreases, and the elongated member 12 achieves a position which is closer to alignment of the vertical axis 11. The sensor 20 detects gradual changes in the position of the distal end 16 of the elongated member 12 as the thrust force 28 is exerted by the propulsion device 18. The sensor 20 may also provide an input to the propulsion device 18 to increase or decrease the thrust force 28 based on the position of the distal end 16 of the elongated member 12 relative to the predetermined upright position. In other words, the sensor 20 may signal the propulsion device 18 to increase the thrust force 28 if the external force 30 is still able to overcome the thrust force 28, thereby preventing the distal end 16 of the elongated member 12 from stabilizing at the predetermined upright position.

FIG. 2C illustrates the distal end 16 of the elongated member 12 in an upright position, in accordance with the present disclosure, where the elongated member 12 has achieved a position aligned, or substantially aligned, with the vertical axis 11. The sensor 20 may provide continuous inputs to the propulsion device 18, which activates to dynamically increase or decrease the thrust force 28 until the predetermined upright position is reached. While the predetermined position may include any position or orientation of the elongated member 12, the predetermined upright position may be any position of the distal end 16 of the elongated member 12, and any components mounted thereto, after being acted on by the thrust force 28 in a partially or substantially vertical position. In one example, the predetermined upright position may be a substantially vertical position, as shown in FIG. 2C. In this example, the predetermined upright position is achieved when the thrust force 28 exerted by the propulsion device 18 is substantially equal to the external force 30. In other words, the net force exerted on the distal end 16 of the elongated member 12 is or is near zero. Thus, in the predetermined upright position, the elongated member 12 has achieved a vertical or substantially vertical position, or another fully or partially vertical position, for at least a period of time, where the net force exerted on the distal end 16 of the elongated member 12 is or is near zero.

In a non-limiting example, the elongated member 12 may have a 4 sided-rectangular prism shape with two propulsion devices 18, each mounted to an opposite face of the elongated member 12 at the distal end 16. If there is no wind force, and the elongated member 12 is bendable, absent activation of the propulsion devices 18, the elongated member 12 may bend or lean, such that it is not positioned substantially vertically. If a substantially vertical orientation of the elongated member 12 is desired, the one of the propulsion devices 18 may initially activate, by way of the sensor 20, to exert an initial thrust force 28 to bend or flex the elongated member 12 in the opposite direction. As the sensor 20 senses the elongated member 12 approaching the vertical position, the other propulsion device 18 positioned on an opposite face of the elongated member 12 may begin to activate, applying a counter thrust force 28. As the elongated member 12 stabilizes in vertical position, the sensor 20 may provide continuous input to each of the propulsion devices 18. These inputs from the sensor 20 may vary the thrust force 28 exerted by each propulsion device 18 until the distal end 16 of the elongated member 12 is stabilized at the predetermined position. The external force 30 may be any force, including a wind force, or a force exerted on the elongated member 12 after being impacted by an object.

In one example the external force 30 is a wind force exerted on the elongated member 12. If the elongated member 12 is fixed to the base 14 such that the wind force only results in a positional change of the distal end 16 of the elongated member 12. In this case, the sensor 20 senses the bending or displacement of the distal end 16 of the elongated member 12 away from the predetermined position. The sensor 20 may signal the propulsion device 18 opposite to the direction of the wind force to increase the thrust force exerted 28. The increased thrust force 28 of the one propulsion device 18 may overcome the wind force exerted on the distal end 16 of the elongated member 12. This, in turn, may move the distal end 16 of the elongated member 12 to the predetermined position. To stabilize the distal end 16 of the elongated member against the wind force, one of the two propulsion devices 18 may exert a greater thrust force 28 relative to the other propulsion device 18. The sensor 20 may continually monitor the position of the distal end of the elongated member 12 and atmospheric conditions to provide continuous inputs to adjust the relative speeds of each propulsion device 18 to maintain the position of the distal end 16 of the elongated member 12 at the predetermined position.

The thrust force 28 may be adjusted continually, dynamically, or at predetermined time intervales, by data accumulated or gathered by the sensor 20. Data gathered by the sensor 20 may include positional data of the distal end 16 of the elongated member 12, which may be collected using gyroscopes, accelerometers, and the like. Data gathered may also include technical aspects of the propulsors, such as the type of motor 24 used, the size of the propellors 26, rotational speed of the motor 24 and propellors 26, and thrust force 28 by each propulsion device 24. Based on gathered data, the sensor 20 may initially send an input on the position of the distal end 16 of the elongated member 12 to a logic controller 32. The logic controller 32 may also receive data input from the sensor 20 regarding thrust force 28, the type of motor 24, rotational speed of the motor 24 and propellors 26, and any other data gathered by the sensor 20. Based on this gathered data, the sensor 20 may initially send an input or accumulated data on the position of the distal end 16 of the elongated member 12 to a logic controller 32. The logic controller 32 may then calculate the amount of thrust force 28 needed to stabilize the distal end 16 of the elongated member 12 to the predetermined position. In some examples, the logic controller 32 may be directly integrated with the sensor 20. In the case of an integrated logic controller 32, the sensor 20 may both receive data input and may output a command control to the propulsion devices 18. In an example where the sensor 20 and logic control 30 are two separate circuit systems, the sensor 20 may continually send data to the logic control 32 and the logic control 32 may output a command control to the propulsion devise 18 and return feedback data to the sensor 20. Feedback data may include total thrust force 28 exerted by each propulsion device 18 and the position of the distal end 16 of the elongated member 12 achieved by the thrust force 28. Based on the feedback data, thrust force 28 exerted by the propulsion devices 18 may be continually adjusted until the predetermined position is substantially achieved.

In another example, the elongated member 12 may be mounted to a base 14 which is a wall. The elongated member 12 may be in a horizontal-like configuration relative to the ground surface. In this configuration, the distal end 16 of the elongated member 12 may have a bend or curve as a result of gravity. That is, the distal end 16 may be closer to the ground along a vertical distance as compared to the bottom portion 22 of the elongated member 12. Upon activation of the one propulsion device 18, the thrust force 28 may stabilize the elongated member to be substantially horizontal at a predetermined position. In other words, the thrust force 28 may exert a pushing or pulling force on the distal end of the elongated member 12 to stabilize the distal end 16 in a horizontal direction.

The sensor 20 and logic controller 32 may be positioned adjacent to one another within a housing, or may be positioned directly on the elongated member 12, or on the propulsion device 18. In some examples, each propulsion device 18 may have its own sensor 20 and logic controller 32. In another example, each propulsion device 18 may have a sensor 20 and a central logic controller 32 may receive inputs from the sensor. In another example, the sensor 20 may be positioned on the distal end 12 of the elongated member 12 and the logic controller 32 may be positioned elsewhere on the elongated member 12, on the base 14, or external to the balance support device 10 and electrically connected to either one of or both of the sensor 20 or propulsion devices 18. In some examples, the sensor 20 may be positioned on the highest, or near highest vertical position of the balance support device 10.

The distal end 16 of the elongated member 12 may be balanced or stabilized without the need for additional mechanical supports, weights, guidewires, or similar devices which may contact the ground surface or another structure. In other words, the predetermined position of the distal end 16 of the elongated member 12 may be maintained by the propulsion devices 18 without the need for tethers, guide wires, and the like, such that the only contact to the ground surface is through elongated member 12 and base 14.

Figure 3:
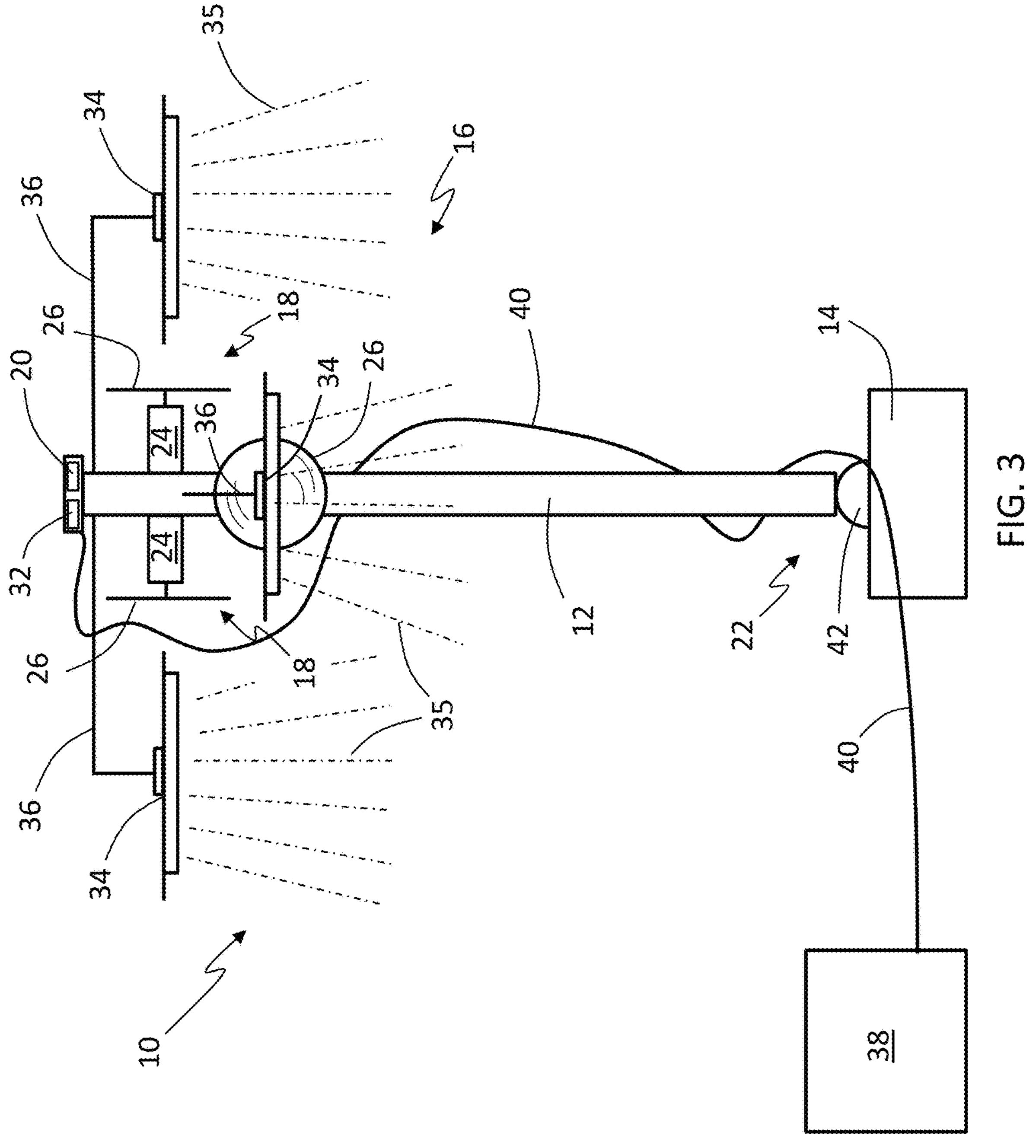
FIG. 3 is a front plan view of a balance support device having fixtures mounted thereto in a predetermined position, in accordance with the present disclosure.

FIG. 3 is a front plan view of a balance support device 10 having fixtures 34 mounted thereto in a predetermined position, in accordance with the present disclosure. The elongated member 12 may be configured such that at least one fixture 34 may be mounted to the elongated member 12. In some examples, the fixture 34 may be mounted to a distal end 16 of the elongated member 12. The fixtures 34 may be removably mounted to the elongated member 12 by a removable mounting member 36. The mounting member 36 may be a frame or similar structure that is used to mount fixtures 34, and may include brackets, braces, tubing, beams, fasteners, and the like. The mounting member 36 may be fabricated from any suitable material including metal, plastic, aluminum, composite materials, fiberglass, and the like and may be fabricated as a rigid body. The fixtures 34 may include lighting devices, loudspeakers, banners, illuminated signs, non-illuminated signs, reflective signs and banners, and the like. In FIG. 3, the fixtures 34 are illustrated as lighting devices which emit a quantity of light 35 towards the ground surface. The lighting devices may be LED strips, LED bulbs, incandescent bulbs, neon lights, fluorescent lights, and the like.

In the case of fixtures 34 that require electrical power, such as lighting devices, loudspeakers, illuminated signs, and the like, electrical power may be provided by an electric power source 38. The electric power source 38 may be positioned external to the balance support device 10 and may include any power source, including a wall or outdoor power outlet, a generator, an uninterruptible power supply, battery, or any other electrical power providing system or module. A power cord 40 may removably attach to the electric power source 38 and may travel up, or be wrapped around the elongated member 12 to electrically connect with the fixtures 34. In one example, the elongated member 12 may have an internally integrated power cord 40 that extends for the entirety of the length of the elongated member 12. In such an example, the elongated member 12 may have an outlet positioned at or around the bottom portion 22. The electric power source 38 may directly connect to the elongated member, and electrical power carried through the power cord 40 which is internally integrated into the elongated member 12. The electric power source 38 may also provide electric power to the propulsion devices 18, sensors 20, logic controllers 32, and any other component which may require electrical power to operate.

A pivot member 42 may also be removably connected to the elongated member 12 at the base 14. The pivot member 42 may serve to indirectly connect or interface the elongated member 12 with the base 14. The pivot member 42 may enable movement or radial movement of the elongated member 12 about the base 14. In other words, the pivot member 42 may allow the elongated member to pivot and/or rotate about the base 14 away from a vertical position while minimizing torque forces experienced by the base 14 caused by movement along the elongated member 12 and at the distal end 16 of the elongated member 12. In one example, the pivot member 42 may provide three degrees of freedom as roll, yaw, and pitch motions. In another example, the pivot member 42 may provide two degrees of freedom as yaw and pitch motions. The pivot member 42 may also be configured to provide only one degree of freedom as either a yaw or pitch motion. By reducing torque force on the base 14 as a result of swaying or bending motions of the distal end 16 of the elongated member 12, the base 14 can be reduced in size and weight. Toppling of the balancing support device 10 may be prevented by the propulsion devices 18 maintaining the position of the distal end 16 of the elongated member 12 in a predetermined position even in the absence of a large or heavy base 14.

Figure 4B:
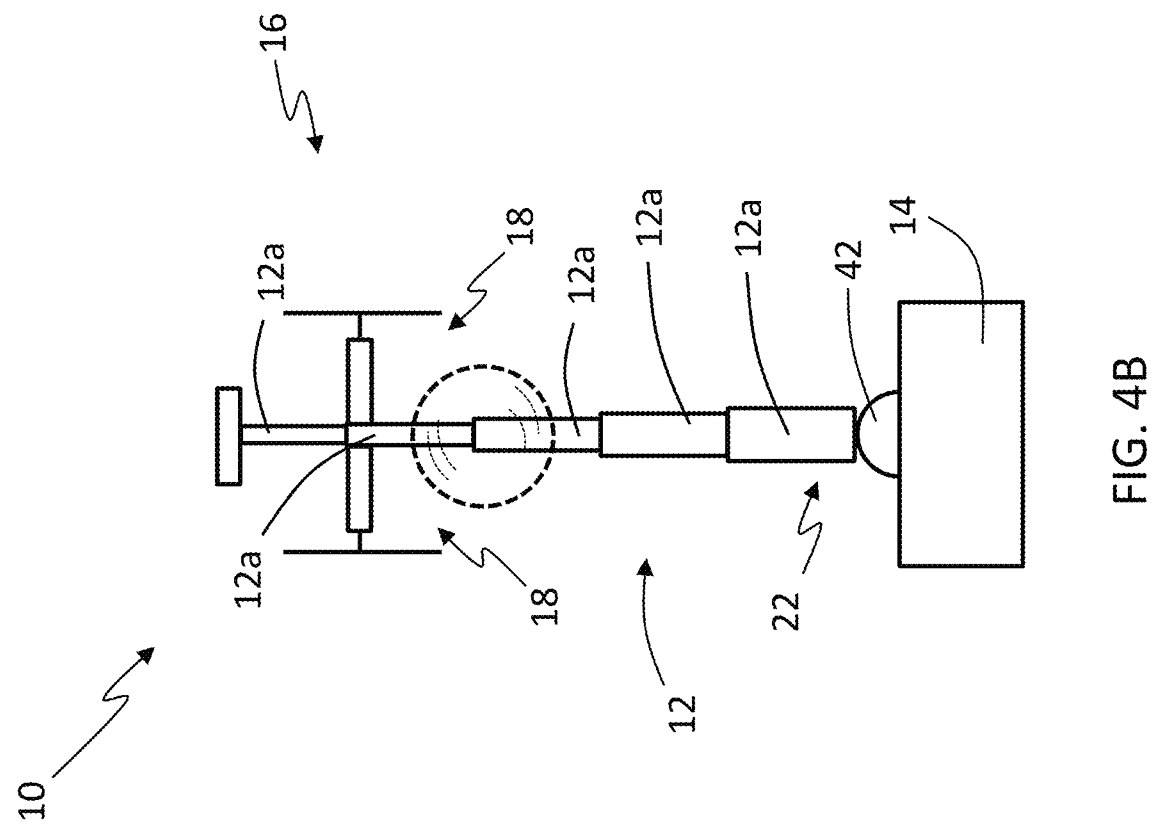
FIG. 4B is a front plan view of a balance support device in an extended position, in accordance with the present disclosure.
Figure 4A:
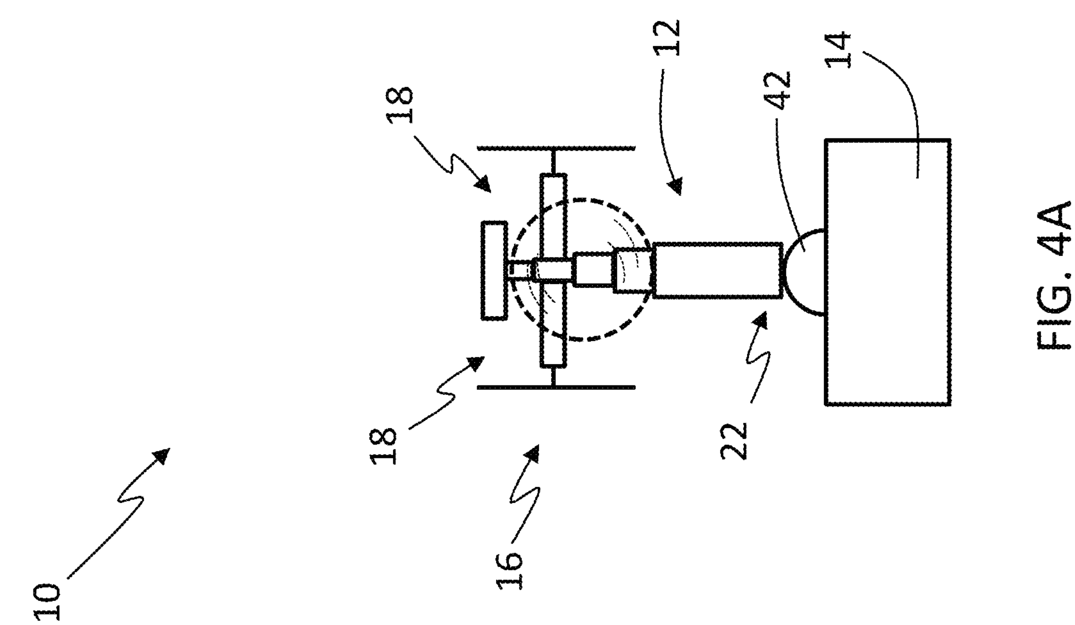
FIG. 4A is a front plan view of a balance support device in a retracted position, in accordance with the present disclosure.

FIG. 4A is a front plan view of a balance support device 10 in a retracted position, in accordance with the present disclosure. FIG. 4B is a front plan view of a balance support device 10 in an extended position, in accordance with the present disclosure. With reference to FIGS. 3-4B, the elongated member 12 may be formed as a retractable member. The retractable nature of the elongated member 12 may ease in the transportability of the balance support device 10. The elongated member 12 may be collapsed such that the balance support device 10 maintains a smaller form factor for transportation. When transported to a target destination, such as a sports event, concert, social gathering, or road hazard situation, the elongated member 12 may be in the retracted position of FIG. 4A. A mounting member 36 for mounting a fixture 34 may be removably mounted to the distal end 16 of the elongated member 12 when in the retracted position. The elongated member 12 can then be placed in the extended position of FIG. 4B to suspend or increase the vertical height of the attached fixture 34. Mounting members 36 and fixtures 34 may also be mounted to the distal end 16 of the elongated member 12 when in the extended position of FIG. 4B.

Several components of the balance support device 10 may also be constructed and designed as modular components. For example, the base 14, when provided as a structural member or weighted component, may removably attach to the elongated member 12. The pivot member 42 attached between the elongated member 12 and the base 14 may also be removably attached as needed based on wind and atmospheric conditions. For example, in high wind environments, a pivot member 42 may be attached to the elongated member 12 and base 14 to reduce torque forces experienced by the base 14. In low or no wind environmental conditions, the pivot member 42 may be removed such that the bottom portion 22 of the elongated member 12 can directly interface with the base 14. Each of the propulsion devices 18 may also be removably attached to the elongated member 12. The propulsion devices 18 may be electrically disconnected from the power cord 40 and may be mechanically disconnected by removing the propulsion devices 18 from a mounting bracket, a fastener, or the like.

Each elongated member modular component 12*a* may also be removably attached. This may be particularly useful where greater vertical heights are desired and additional elongated member modular components 12*a* may be successively added to increase total vertical height. The modularity of the balance support device 10 also provides ease in maintenance and replacing parts as components, over time, become worn, or become damaged from wind conditions or impacts from objects.

In another example, and with reference to FIGS. 2A-2C, the elongated member 12 may be stored in a substantially horizontal configuration relative to the base 14 or other surface. Upon activation of one of the propulsion devices 18, the elongated member 12 may pivot at a pivot member 42 and move from the substantially horizontal configuration to the predetermined position, such as an upright position. For example, in an undeployed state, the balance support device 10 may be mounted to a truck, platform, or other vehicle where a portion of the truck, platform, or other vehicle is the base 14. In a deployed state, one of the propulsion devices 18 may exert a pulling or pushing force on the distal end 16 of the elongated member 12 to bring the distal end 16 of the elongated member 12 to the predetermined position. To store the balance support device 10, it may be returned to the undeployed state by gradually decreasing the thrust force 28 in a direction, thereby gradually leaning the elongated member 12 about the pivot member 12 until it is at rest in a substantially horizontal configuration. The elongated member 12 may also be configured with one propulsion device 18 which, when activated orients the elongated member 12 from a substantially horizontal configuration to a vertical configuration.

When mounted to a wall in an undeployed state, the elongated member 12 may be in a substantially vertical position with the distal end 16 positioned closest to the ground, and the bottom portion 22 attached to a pivot member 42 on the wall. The pivot member 42 may be a hinge having one degree of freedom. The one propulsion device 18 may activate to move the elongated member 12 in a single degree of motion. When the one propulsion device 18 is activated on the distal end 16, the elongated member 12 may move from a substantially vertical position to a substantially horizontal deployed position. In other words, as the propulsion device 18 exerts a thrust force 28 on the distal end 16, the elongated member 12 hinges at the hinge to move from a substantially vertical position to a substantially horizontal position, which is the deployed position.

Figures 5A, 5B:
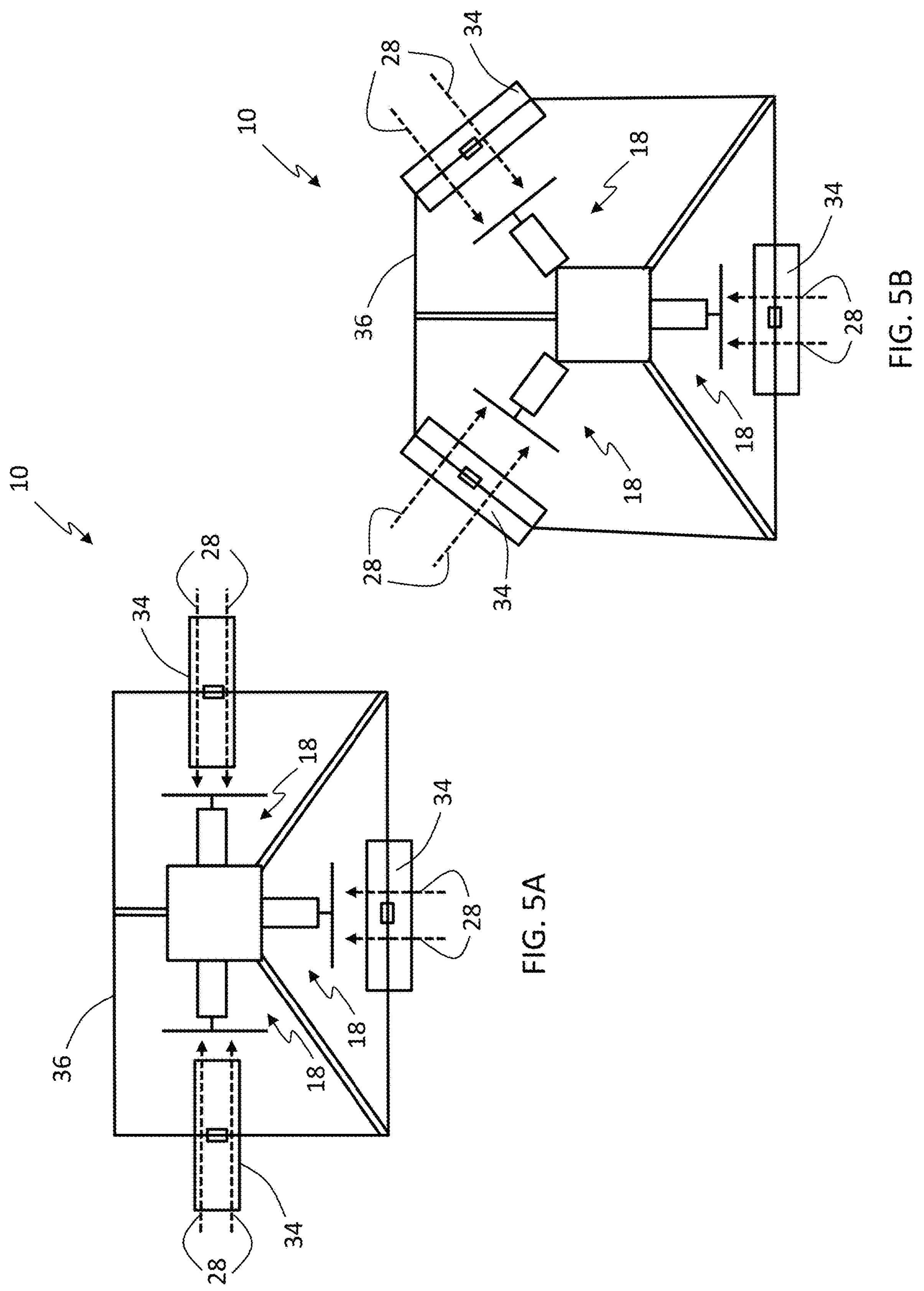
FIGS. 5A-5D are top plan views of examples of a balance support device, in accordance with the present disclosure.

FIGS. 5A-5D are top plan views of various examples of a balance support device 10, in accordance with the present disclosure. For instance, FIGS. 5A-5B are top plan views of a balance support device 10 having three propulsion devices 18 in a triangular configuration. A triangular configuration of three propulsion devices 18, when activated, may provide sufficient stability to the distal end 16 of the elongated member 12 in all lateral directions. When activated, the thrust force 28 of the propulsion devices 18 may also produce airflow which travels in the direction of an airflow path. The airflow path is antiparallel to the thrust force 28 and is produced as a result of the thrust force 28. The fixtures 34 may be positioned substantially along the airflow path of the propulsion devices 18, and the airflow, resultant of the thrust force 28, may cool the fixtures 34. This arrangement, whereby the fixtures 34 are arranged along the airflow path of the propulsion devices 18 may be used where the fixtures 34 produce heat or waste heat. In one example, the fixtures 34 are lighting devices, which may heat up over time. Positioning the lighting devices substantially along the airflow path may aid in cooling the lighting devices without the need for additional components, fans, or cooling methods.

Figures 5C, 5D:
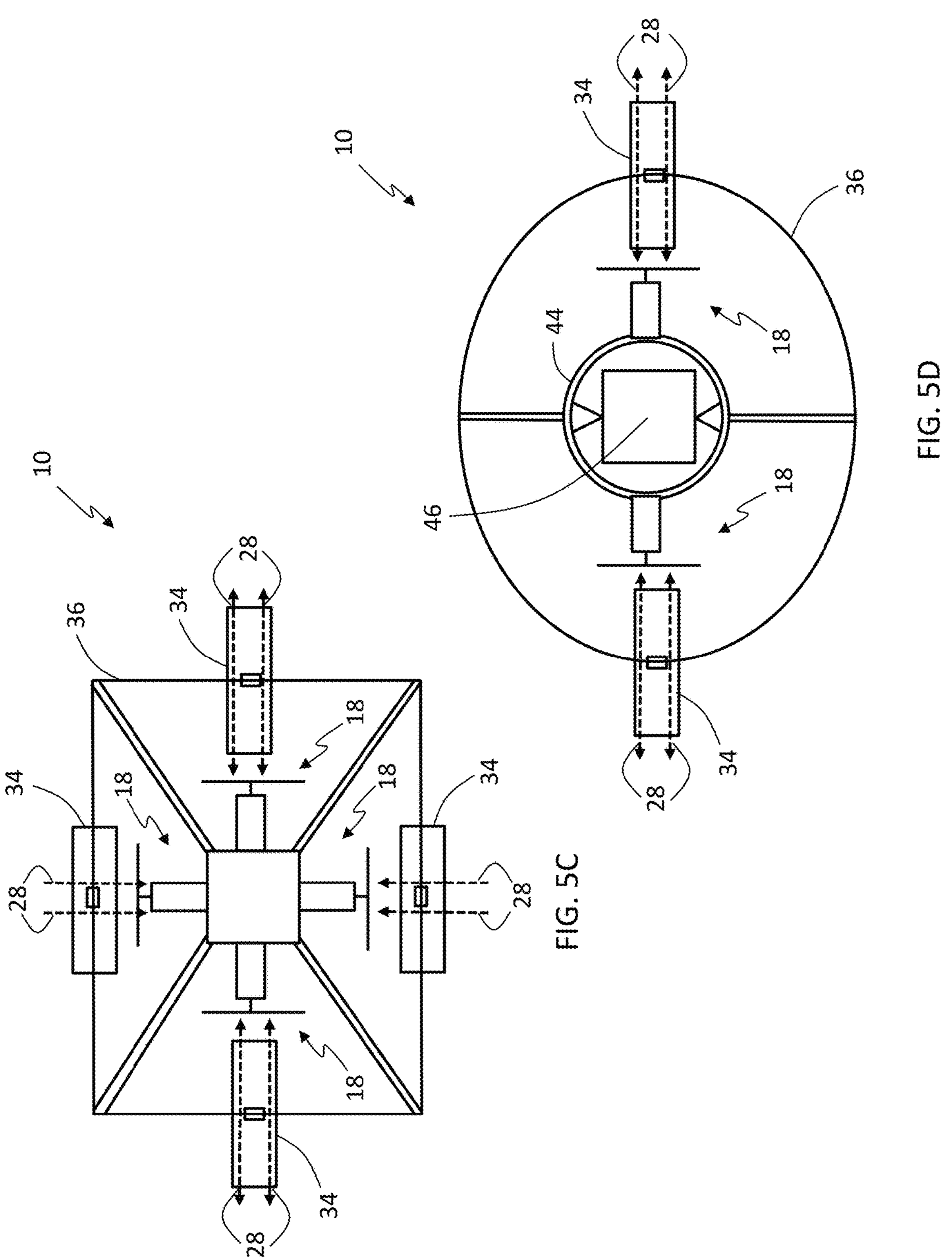

FIG. 5C is a top plan view of a balance support device 10 having four propulsion devices 18 arranged orthogonal to one another. An orthogonal arrangement of four propulsion devices 18 provides stability to the distal end 16 of the elongated member 12 in all lateral directions. For example, if the elongated member 12 is a four-sided rectangular prism that has a distal end 16 bendable and flexible in two degrees of freedom (up, down, right, and left, as viewed in FIG. 5C), a wind force incident on any side of the elongated member 12 may be directly counteracted by a thrust force 28 exerted by a propulsion device 18 in the opposite direction. In the case of a wind force incident to an edge or vertex of the elongated member 12, at least two propulsion devices 18 opposite to the direction of the wind force may activate to stabilize the elongated member 12 to the predetermined position.

FIG. 5D is a top plan view of a balance support device 10 having a rotatable carrier 44 for the propulsion devices 18, in accordance with the present disclosure. The rotatable carrier 44 may be configured to attach to the propulsion devices 18 and to the mounting member 36 with fixtures 34 mounted thereto. The rotatable carrier 44 enables rotational movement about a center axis 46 of the elongated member 12. With reference to FIG. 3, the rotatable carrier 44 may be electrically connected to the sensor 20 or logic controller 32. The rotatable carrier 44 may rotate upon input from the sensor 20 or logic controller 32. For example, the sensor 20 or logic controller 32 may use positional and environmental data to determine the direction of a wind force. In response to this data, the sensor 20 or logic controller 32 may signal the rotatable carrier 44 having the propulsion devices 18 mounted thereto, to rotate in order to counteract the wind force displacing, bending, or flexing the distal end 16 of the elongated member 12 away from the predetermined position. The rotatable carrier 44 may continuously rotate and adjust the position of the propulsion devices 18 to maintain the predetermined position of the distal end 16 of the elongated member 12.

FIG. 6 is a front plan view of balance support devices 10 in a vertically stacked arrangement, in accordance with the present disclosure. Balance support devices 10 may be arranged in a vertically stacked arrangement to increase maximum height of the distal end 16 of the elongated member 12. To power balance support devices 10 arranged in a vertically stacked arrangement, the power source 38 may supply power to the first balance support device 10 via the power cord 40. The second balance support device 10 stacked on top of the first balance support device 10 may be wired in series with the first balance support device 10. This arrangement allows for a single electric power source 38 to supply electric power to both or all balance support devices 10, when either vertically stacked, or arranged adjacent to one another.

In some examples each balance support device 10 may be configured and structured substantially the same and stacked. In other examples, a first balance support 10*a* device may be configured in a manner different from the second balance support device 10*b* to form a balance support system. Such a system may have a first and second elongated member 12*b*, 12*c*. The first elongated member 12*b* may be configured to interface with a base 14 such that a distal end 16*a* of the first elongated member 12*b* extends away from the base 14. Each of the first and second elongated members 12*b*, 12*c* may have at least two propulsion devices 18*a*, 18*b* attached thereto. An end member 14*b* may be attached to the distal end 16*a* of the first elongated member 12*b*. The end member 14*b* may be configured to removably attach to the second elongated member 12*c*. The balancing support device 10 may include at least one sensor 20 that is attached to either one of, or both of, the first or second elongated members 12*b*, 12*c*. The sensor 20 may be used to activate at least one of the two propulsion devices 18*a*, 18*b* on either one of the first and second elongated members 12*b*, 12*c*. When activated, at least one of the first and second elongated members 12*b*, 12*c* are stabilized to a predetermined position.

The bottom portion 22*a* of the second elongated member 12*c* may be able to directly interface with the end member 14*b* of the first elongated member 12*b*. In some examples, a pivot member 42 may be positioned between the first elongated member 12*b* and the base 14 and between the second elongated member 12*c* and the end member 14*b*. A two-part balance support device 10 system may have four propulsion devices 18*a*, 18*b*. In operation, to align the first and second elongated members 12*b*, 12*c* to the predetermined position, any one of the four propulsion devices 18*a*, 18*b* may be activated. In certain cases where an object impacts or wind force is exerted directly or most proximal to the distal end 16*a* of the first elongated member 12*b*, a subset of all propulsion devices 18*a*, 18*b* may be activated. For example, if an object impacts the two-part balance support device 10 of FIG. 6 at or around the distal end 16*a* of the first elongated member 12*b*, one of the propulsion devices 18*a* of the first elongated member 12*b* may activate to counteract the force and stabilize the balance support system 10. This stabilization may be done at a rate, such that minimal shock or displacement is experienced at a second distal end 16*b* of the second elongated member 12*c*.

Each balance support device 10 arranged in a vertically stacked arrangement may have its own respective mounting member 36 and fixtures 34 attached thereto. In some examples, only the second balance support device 10*b* will have a mounting member 36 and fixture 34 attached thereto. In such an example, the distal end 16*a* of the first elongated member 12*b*, may have at least two propulsion devices 18*a* mounted thereto. Thus, a two-part balance support device 10 system may have at least four propulsion devices 18*a*, 18*b* in total. The multi-part balance support device 10 system may be balanced without the need for additional mechanical supports, weights, or guidewires. In other words, the predetermined position of each distal end 16*a*, 16*b* of each elongated member 12*b*, 12*c*, may be maintained by the propulsion devices 18*a*, 18*b* without the need for tethers, guide wires, and the like. Any additional balance support devices 10 may be added.

With reference to FIGS. 3 and 6, when the balance support devices 10*a*, 10*b* are electrically connected in series, the distal ends 16*a*, 16*b* may be configured to perform coordinated movements. That is, fixtures 34 mounted to each of the distal ends 16*a*, 16*b* of the elongated members may be configured to stabilize to different predetermined positions. For example, in a vertically stacked arrangement of elongated members 12*b*, 12*c*, one elongated member 12*b*, 12*c* may be configured to lean or stabilize in a first predetermined position. The other elongated member 12*b*, 12*c* may be configured to lean or stabilize in a second predetermined position, which may or may not align with a footprint of the first predetermined position. The predetermined positions may be continuously updated by either the sensor 20 or logic controller 32. Thrust force 28 of each propulsion device 18*a*, 18*b* may be continually updated based on the predetermined position, and may allow movement of fixtures 34 or other objected mounted to the mounting member 36 to be moved from a first predetermined position to a second predetermined position.

Figure 7B:
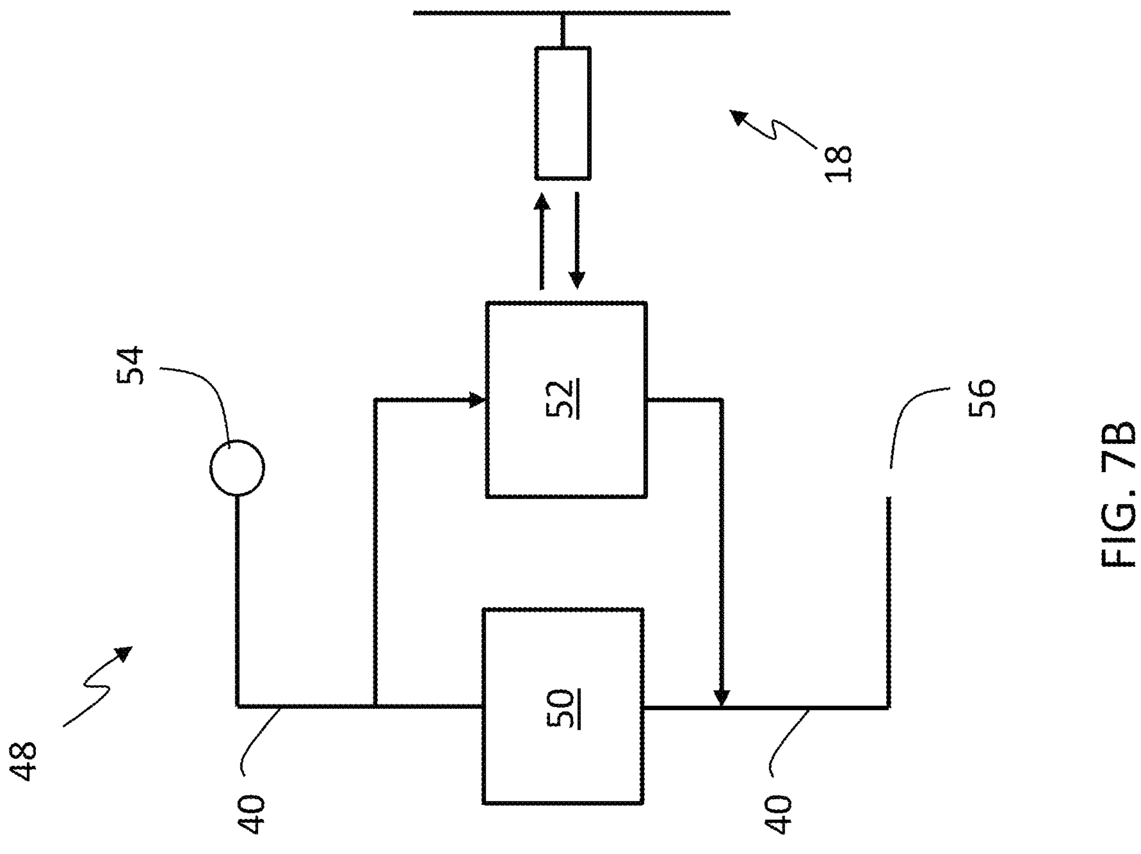
FIGS. 7A-7B are schematic illustrations of an electric circuit used to power the propulsion devices, in accordance with the present disclosure.
Figure 7A:
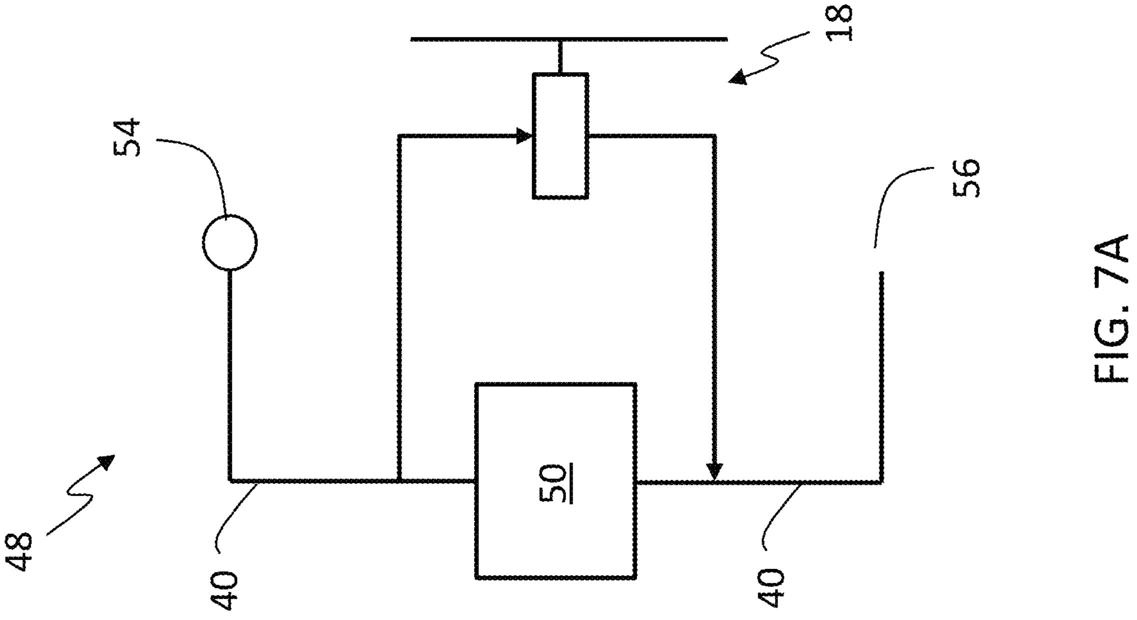

FIGS. 7A-7B are schematic illustrations of an electric circuit 48 used to power the propulsion devices 18, in accordance with the present disclosure. FIG. 7A illustrates an amperage boost regulator 50 electrically connected to the propulsion device 18 in parallel. The amperage boost regulator 50 is a resistance device, such as a diode, which increases in resistance as voltage across the amperage boost regulator 50 decreases. The amperage boost regulator 50 acts by decreasing amperage and voltage variances across the parallel circuit formed between the amperage boost regulator 50 and the propulsion devices 18. With reference to FIG. 6, as more electric circuits 48 are added in parallel, by way of electrically connecting balance support devices 10 in series by the power cord 40, only power supply voltage will need to be increased rather than amperage. Accordingly, the size of the power cord 40 need not be increased to accommodate higher amperages as more balance support devices 10 are added. This may be beneficial by decreasing the overall weight of the balance support device 10 system, thus easing in portability. Furthermore, production costs may be decreased, as smaller power cords 40 may be used.

FIG. 7B illustrates an amperage boost regulator 50 electrically connected to a DC voltage regulator 52 in parallel. The DC regulator 52 is then electrically connected to the propulsion devices 18. The DC regulator 52 may be a fixed voltage or a fixed ratio DC regulator 52. The DC regulator 52 may include various types of step-down converters or similar devices, such as, for instance, a buck converter which is a DC-to-DC power converter which outputs lower voltage relative to the input voltage, and output higher amperage relative to the input amperage.

With reference to FIGS. 6 and 7A-7B, the positive terminal 54 may connect to the electric power source 38. Electrical power from the electric power source 38 may be carried through the power cord 40 and into the electric circuit 48. Additional balance support devices 10 may be connected electrically in series at the negative terminal 56.

Figure 8:
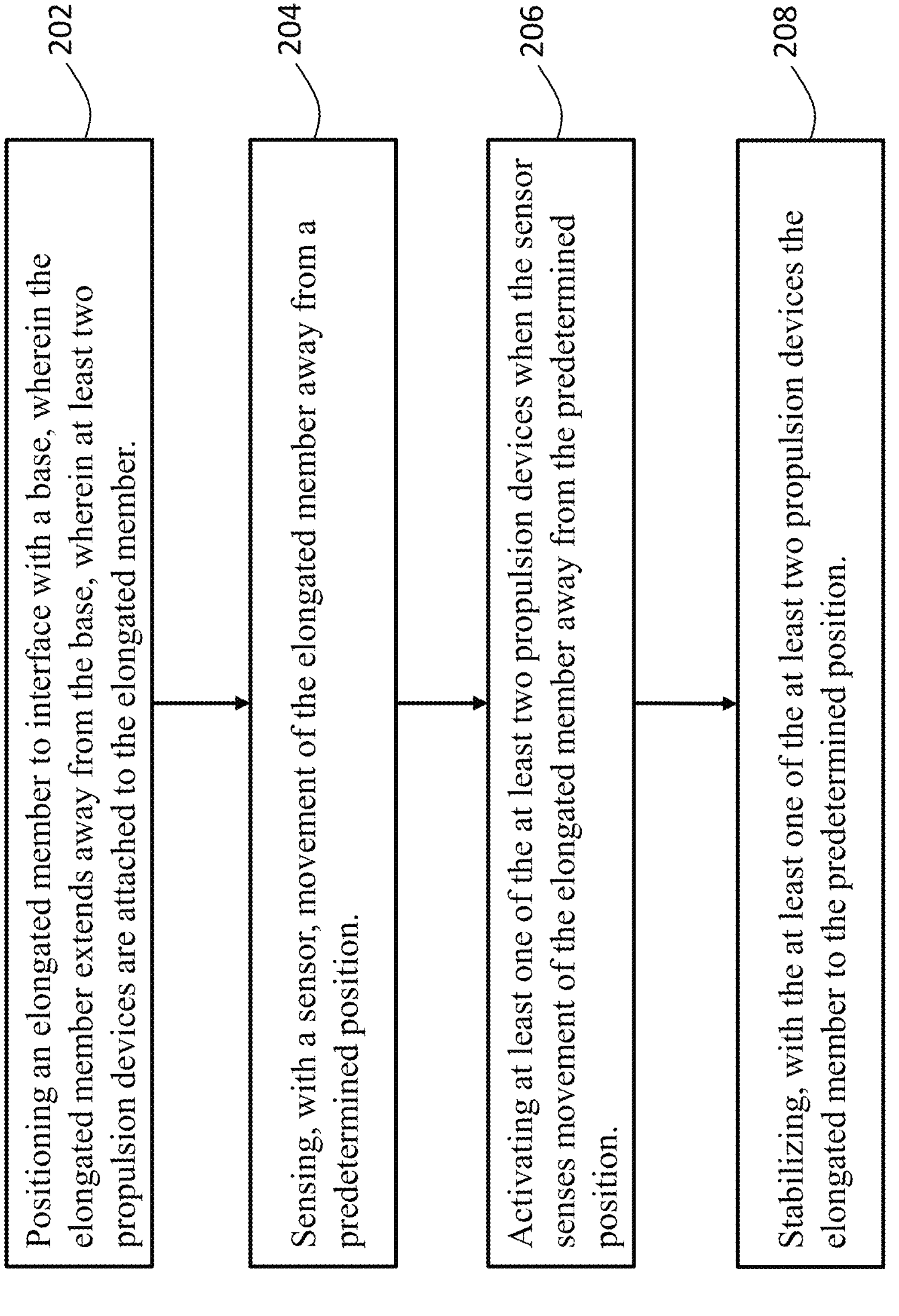
FIG. 8 is a flowchart illustrating a method of balancing a support device in accordance with the present disclosure.

FIG. 8 is a flowchart 200 illustrating a method of balancing a support device 10 in accordance with the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, an elongated member is positioned to interface with a base, wherein the elongated member extends away from the base, wherein at least two propulsion devices are attached to the elongated member. At block 204, a sensor senses movement of the elongated member away from a predetermined position. At block 206, at least one of the at least two propulsion devices is activated when the sensor senses movement of the elongated member away from the predetermined position. At block 208, at least one of the at least two propulsion devices stabilizes the elongated member to the predetermined position.

With reference to FIGS. 5A-6, the fixtures 34 may also be positioned to be air-cooled by the propulsion devices 18. Positioning the fixtures 34 in the airflow path of the propulsion devices 18 may enable air-cooling of the fixtures 34. The airflow path is the direction of airflow exerted by the propulsion devices 18 and may be antiparallel to the thrust force 28. A pivot member 42 may also be connected to the elongated member 12 at the base 14. The pivot member 42 enables movement of the elongated member 12 away from a substantially vertical axis thereby reducing torque forces on the base 14.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A balancing support device, comprising:

an elongated member configured to interface with a base at a first end, wherein a second end of the elongated member extends away from the base;

at least one propulsion device attached to the elongated member at the second end, the at least one propulsion device having a motor and a propeller; and at least one sensor in electrical communication with the at least one propulsion device, wherein the at least one sensor activates the at least one propulsion device, wherein when activated, the at least one propulsion device stabilizes the elongated member to a predetermined position.

2. The balancing support device of claim 1, wherein the predetermined position further comprises a predetermined upright position.

3. The balancing support device of claim 1, further comprising at least one fixture mounted to the elongated member.

4. The balancing support device of claim 3, wherein the at least one fixture is a lighting device.

5. The balancing support device of claim 4, wherein the at least one lighting device is positioned along an airflow path of the at least one propulsion device, wherein air of the airflow path cools the at least one lighting device.

6. The balancing support device of claim 1, wherein the at least one propulsion device further comprises at least three propulsion devices arranged in a triangular configuration.

7. The balancing support device of claim 1, wherein the at least one propulsion device further comprises at least four propulsion devices arranged orthogonally to one another.

8. The balancing support device of claim 1, further comprising a pivot member connected to the elongated member at the base.

9. A method of balancing a support device, comprising:

positioning an elongated member to interface with a base at a first end, wherein a second end of the elongated member extends away from the base, wherein at least one propulsion device having a motor and a propeller is attached to the elongated member at the second end;

sensing, with a sensor, movement of the elongated member away from a predetermined position;

activating the at least one propulsion device when the sensor senses movement of the elongated member away from the predetermined position; and stabilizing, with the at least one propulsion device, the elongated member to the predetermined position.

10. The method of claim 9, wherein the predetermined position further comprises a predetermined upright position.

11. The method of claim 9, further comprising mounting at least one fixture to the elongated member.

12. The method of claim 11, wherein the at least one fixture is a lighting device.

13. The method of claim 12, further comprising air-cooling the at least one lighting device by positioning the at least one lighting device along an airflow path of the at least one propulsion device.

14. The method of claim 9, further comprising arranging three propulsion devices in a triangular configuration.

15. The method of claim 9, further comprising arranging four propulsion devices orthogonally to one another.

16. The method of claim 9, further comprising positioning a pivot member connected to the elongated member at the base, whereby the pivot member enables movement of the elongated member away from a vertical axis thereby reducing torque forces on the base.

17. A balancing support system, comprising:

a first and a second elongated member, wherein the first elongated member is configured to interface with a base, wherein a distal end of the first elongated member extends away from the base, and wherein each of the first and second elongated member has at least one propulsion device attached thereto, the at least one propulsion device having a motor and a propeller;

an end member attached to the distal end of the first elongated member, wherein the end member is configured to removably attach to the second elongated member; and at least one sensor attached to the first or second elongated member, wherein the at least one sensor activates the at least one propulsion device on at least one of the first and second elongated members to produce an airflow and resultant thrust force, wherein when activated, at least one of the first and second elongated members is stabilized to a predetermined position by the resultant thrust of the at least one propulsion device.

18. The system of claim 17, wherein the predetermined position further comprises a predetermined upright position.

19. The system of claim 17, further comprising mounting at least one fixture to at least one of the first and second elongated members.

20. The system of claim 19, wherein the at least one fixture is a lighting device.

21. The system of claim 20, wherein the at least one lighting device is positioned along an airflow path of the at least one propulsion device of at least one of the first and second elongated members.

22. The system of claim 17, wherein the first and second elongated members are arranged in a vertically stacked arrangement.

23. The system of claim 17, further comprising an amperage boost regulator electrically connected in parallel to the at least one propulsion device of each of the first and second elongated members.

* * * * *